Aug. 19, 1930.   L. A. LARSEN   1,773,490
VARIABLE SPEED MECHANISM
Filed July 24, 1925   2 Sheets-Sheet 1
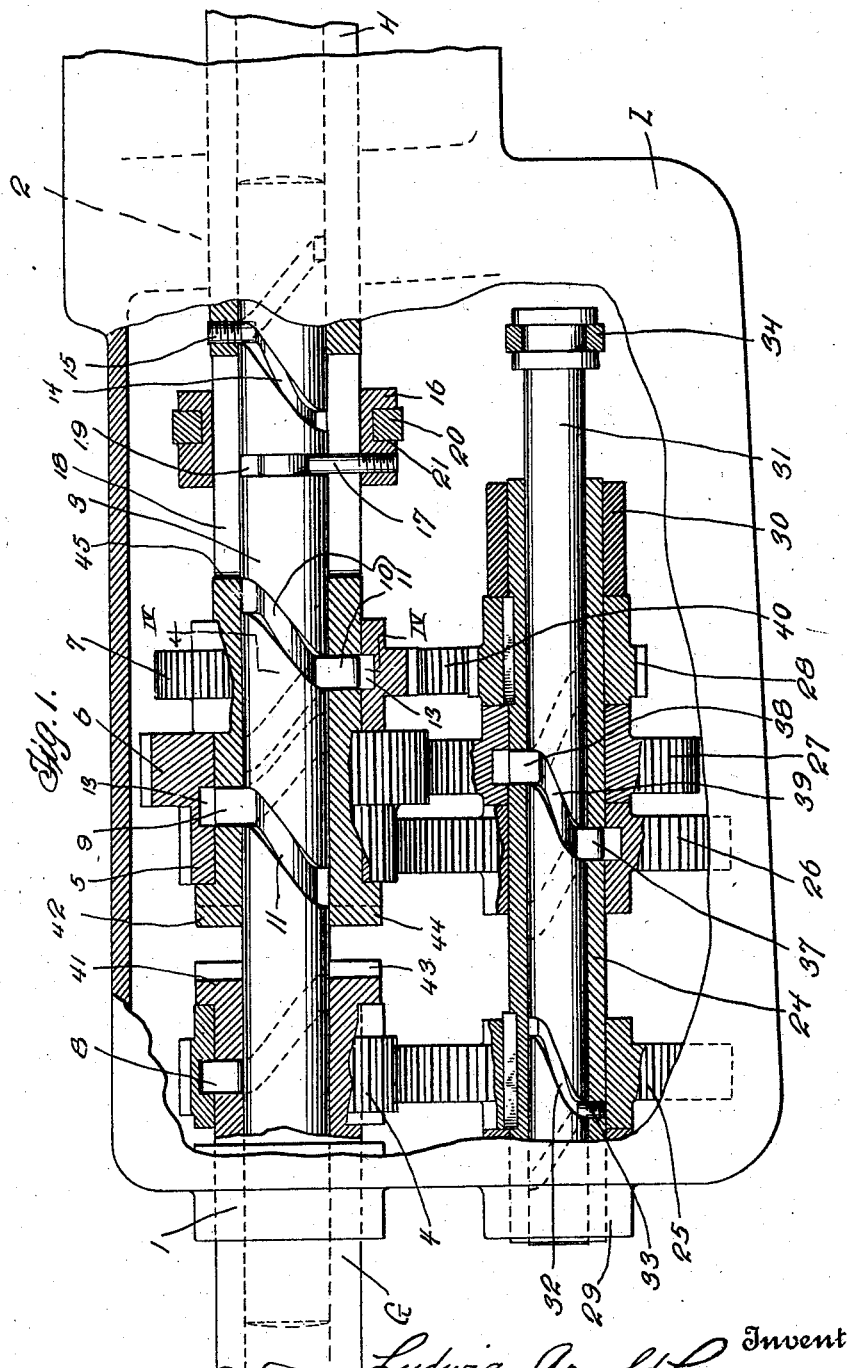
Ludwig Arnold Larsen Inventor
By his Attorney Aug. 19, 1930.                L. A. LARSEN                1,773,490
                        VARIABLE SPEED MECHANISM
                    Filed July 24, 1925      2 Sheets-Sheet 2
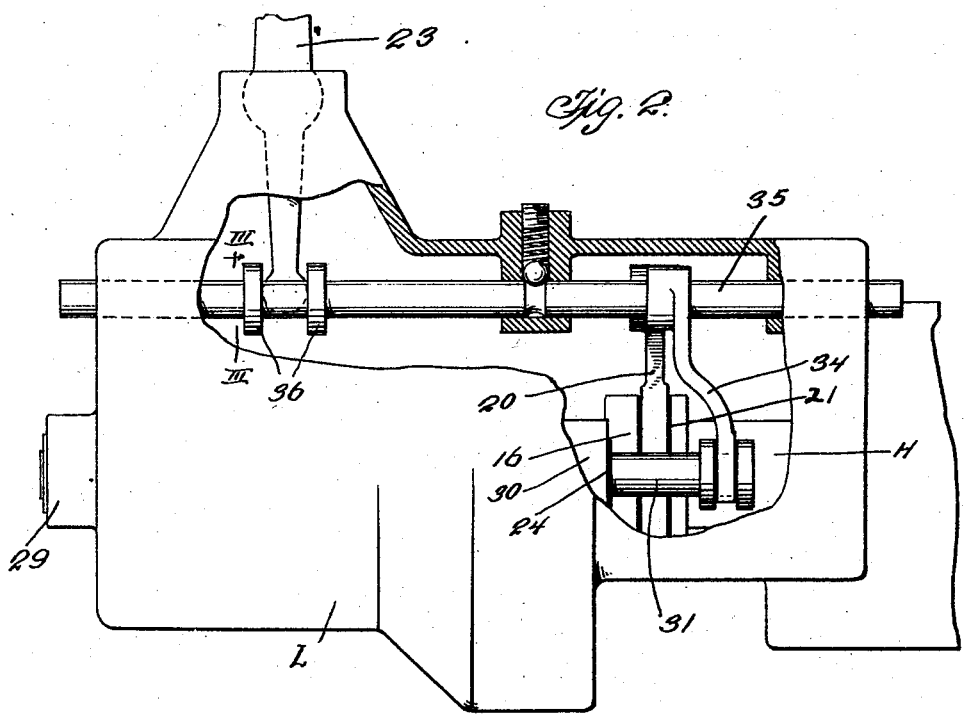
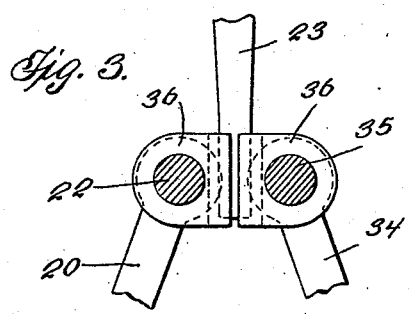
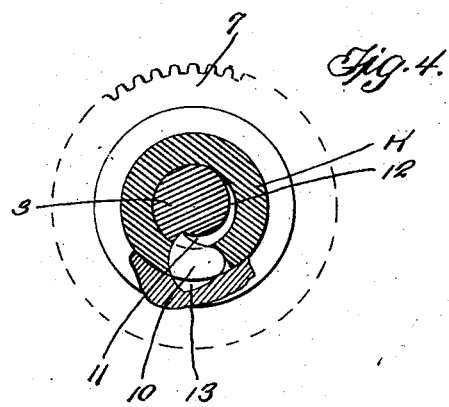

Patented Aug. 19, 1930

1,773,490

UNITED STATES PATENT OFFICE

LUDWIG ARNOLD LARSEN, OF SOUTH OZONE PARK, NEW YORK

VARIABLE SPEED MECHANISM

Application filed July 24, 1925. Serial No. 45,940.

This invention relates to a variable speed gear such as is employed in automobiles and like construction.

An object of the invention is to provide a gear which will be of simple and efficient construction and which may be easily operated, and in which the various gear wheels will stand constantly in mesh with each other.

A more detailed object is to provide a speed changing gear in which are several sets of cooperative gear wheels, the sets being of different ratios, and being always in mesh, and to provide a readily controllable means whereby the sets may be brought into and out of operation selectively at will.

Other objects and aims of the invention, more or less specific than those referred to above, will be in part obvious and in part pointed out in the course of the following description of the elements, combinations, arrangements of parts and applications of principles constituting the invention, and the scope of protection contemplated will be indicated in the appended claims.

In the accompanying drawings which are to be taken as a part of this specification, and in which I have shown merely a preferred form of embodiment of the invention:—

Fig. 1 is a plan view of a variable speed gear constructed in accordance with this invention, portions being shown in horizontal section for the disclosure of details.

Fig. 2 is a side view of the structure seen in Fig. 1, parts being here also shown in section for the disclosure of details.

Fig. 3 is a transverse detailed sectional view taken upon the plane of line III—III of Fig. 2, and Fig. 4 is a transverse detailed sectional view through one of the shafts employed and showing the manner in which the gear wheels may be selectively connected to and disconnected from the shaft, the section being taken substantially upon line IV—IV of Fig. 1.

Referring to the drawings for describing in detail the structure shown therein the reference character L indicates a suitable casing into which projects the power or engine shaft G, the same being received within a suitable bearing as 1 provided in the casing wall.

Aligned with the shaft G and also projecting into the casing is the driven shaft H. This may be supported in a bearing as 2 at the opposite end of the casing.

Both of the shafts G and H are hollow and a core piece or cam shaft 3 is arranged therein being partly received within the hollow of the shaft G and partly within the hollow of the shaft H. This cam shaft is both rotatable and slidable within the shafts G and H.

Mounted upon the shaft G within the casing is a drive gear 4, while mounted upon the shaft H within the casing are other gears as 5, 6, and 7, the gears 5 and 6 being rigidly connected together. All of the gears 4, 5, 6, and 7 are mounted to be normally freely rotatable upon their carrying shafts but may be connected to rotate with the shafts at will by the selective manual operation of suitable locking keys of which there is shown one as 8 for the gear 4, one as 9 for the gears 5 and 6, and one as 10 for the gear 7.

These keys may take any appropriate form but for the purpose of illustration are seen herein, particularly in the view Fig. 4 as being in the form of pivotally mounted dogs carried by the shafts G and H and adapted to swing radially into and out of said shafts. When in their inward positions they rest within the deepest portions of cam grooves 11 provided in the shaft 3 and when said shaft is rotated so as to bring the shallower ends as 12 of said grooves against the keys the keys are moved outwardly and into pockets as 13 provided in the gears to receive them.

A suitable spiral slot 14 is provided in the cam shaft and a pin as 15 projects into said slot whereby to cause the cam shaft to rotate whenever moved longitudinally.

Longitudinal movement of the cam shaft may be effected in any appropriate manner but for the purpose of illustration herein a collar as 16 is provided encircling the shaft H and having a pin 17 projecting through a slot 18 of said shaft and into an annular groove 19 provided in the cam shaft. A yoke 20 engages within a groove 21 of the collar 16 and this is rigidly connected with a longitudinally slidable shaft 22 arranged to be moved by the usual gear shift lever as 23.

It should here be noted that although both a longitudinal and a rotating movement of the cam shaft is shown for operating the keys 8, 9 and 10 nevertheless said keys can be as readily operated by other means for instance by either a simple longitudinal movement of the cam or by a simple rotary movement of the cam shaft, it being understood of course that the contours of the cam surfaces provided upon the cam shaft would be modified accordingly.

Arranged parallel to the shafts G and H is an auxiliary shaft 24 carrying gears 25, 26, 27 and 28, said shaft being suitably mounted in bearings as 29 and 30 provided by the casing.

Like the shafts G and H the auxiliary shaft 24 is also hollow and into it is placed a core piece or cam shaft 31 the latter being both slidable and rotatable within the shaft 24 and having a spiral groove as 32 engaging a pin 33 for causing rotary movement as the result of longitudinal movement in the same manner as above set forth with respect to the cam 3.

The longitudinal movement of the cam shaft 31 is preferably under the control of a yoke member 34 fixed rigidly to a sliding shaft 35, parallel with the shaft 22 and adapted to be slid back and forth by the operating handle 23.

The shafts 22 and 35 each carry suitable shoulder members 36 between which extends the lower end of the lever 23 for selective operation of the shafts 22 and 35 in a well-known manner.

The gear 25 is fixed rigidly upon the shaft 24, as is also the gear 28.

The gears 26 and 27 are mounted to rotate freely upon the shaft 24 but may be selectively connected with said shaft by suitable keys 37 and 38 which are arranged to be controlled by cam grooves 39 in the same manner as are the keys 8, 9 and 10.

A suitable intermediate gear as 40 may be provided for connecting the gears 28 and 7 for thereby causing a reverse rotation of the shaft H upon occasion.

It will be understood from this description that with the shaft G rotating the operator may cause rotation of the shaft H at different speeds and in different directions selectively at will by merely moving the lever 23 to cause the cam shafts 3 and 31 to move into one position or another for properly controlling the engagement and disengagement of the keys in their respective gears.

The adjacent end portions as 41 and 42 of the shafts G and H are provided with cooperative lug parts 43 and 44 respectively and it is intended that these shall be brought together whenever it is desired to drive the shaft H directly by and at the same speed as the shaft G. For this purpose the shaft H is longitudinally movable within the casing and is adapted to be moved so as to bring the parts 43 and 44 into engagement with each other by movement of the pin 17 against the end wall 45 of the cross slot 18. Continued movement of the pin after this engagement will cause the shaft G to be moved with the pin, it being understood that movement of the pin 17 into position against the end wall 45, and the corresponding movement of the cam shaft 3, will cause disengagement of the keys 9 and 10 from their seats 13 so that the shaft G will be free to slide longitudinally, and carry keys, without necessarily carrying the corresponding gears.

The lever 23 is adapted to enable the required full movement of the pin 17 through the connections already described.

As many changes could be made in this construction without departing from the scope of the invention as defined in the following claims, it is intended that all matter contained in the above description or shown in the accompanying drawings, shall be interpreted as illustrative only and not in a limiting sense.

Having thus described my invention, what I claim as new and desire to secure by Letters Patent is:—

1. A variable speed gear comprising a drive shaft, a driven shaft, at least one of said shafts being hollow, a gear carried by said hollow shaft having constant gear connection with the other shaft, and means extending into the hollow of the hollow shaft for selectively connecting said gear with said hollow shaft at will, said means including a rotatable shaft having a cam groove circumferentially thereof, means to rotate said rotatable shaft, and a part engaging within said cam groove adapted to be moved into engagement with said gear upon rotation of said rotatable shaft.

2. A variable speed gear comprising a drive shaft, a driven shaft, at least one of said shafts being hollow, a plurality of gear wheels carried by the hollow shaft having constant gear connection with the other shaft, a cam shaft arranged within the hollow of the hollow shaft, means to rotate the cam shaft within the hollow shaft, and means to be operated by the rotation of the cam shaft for connecting said carried gears with the hollow shaft selectively at will, and means to operate said cam shaft.

3. A variable speed gear comprising a drive shaft, a driven shaft, at least one of said shafts being hollow, a plurality of gear wheels carried by the hollow shaft having constant gear connection with the other shaft, a cam shaft arranged within the hollow of the hollow shaft, means to both slide said cam shaft and rotate it within the hollow shaft, and means to be operated by the sliding and rotating movement of the cam shaft for thereby connecting said carried gears with the hollow shaft selectively at will.

4. A variable speed gear comprising a drive shaft, a driven shaft, an auxiliary shaft, gear wheels carried by all of said shafts in constant mesh with each other, certain of said gear wheels upon at least two of said shafts being normally freely rotatable with respect to each other upon their carrying shafts, and means to connect simultaneously said last mentioned gear wheels with their carrying shafts selectively at will, comprising a pair of independently movable control members arranged as cores slidably movable one within a longitudinal bore of the driven shaft and the other longitudinally movable within a bore of the auxiliary shaft, means whereby longitudinal movement of said control members will produce rotary movement thereof, means whereby the rotary movement of said control members will effect the connection between the shafts and the gear wheels, a single operating handle, and means whereby said handle is adapted for longitudinally moving the control members selectively at will.

5. A variable speed gear comprising a drive shaft, a driven shaft, at least one of said shafts being hollow, a gear carried by said hollow shaft having constant gear connection with the other shaft, and means extending into the hollow of the hollow shaft selectively operable to either connect said gear with said hollow shaft or to cause said two shafts to directly engage together for the purpose set forth.

In testimony whereof I affix my signature.

LUDWIG ARNOLD LARSEN.